US012168524B2

(12) United States Patent
Reinck et al.

(10) Patent No.: US 12,168,524 B2
(45) Date of Patent: Dec. 17, 2024

(54) DEVICE FOR PREVENTING ACCESS TO AN AREA OF AN AIRCRAFT

(71) Applicant: Schroth Safety Products GmbH, Arnsberg (DE)

(72) Inventors: Wilko Reinck, Bad Sassendorf (DE); Stefan Bach, Arnsberg (DE); Mike Höhn, Bad Sassendorf (DE)

(73) Assignee: Schroth Safety Products GmbH, Arnsberg (DE)

( * ) Notice: Subject to any disclaimer, the term of this patent is extended or adjusted under 35 U.S.C. 154(b) by 248 days.

(21) Appl. No.: 17/622,628

(22) PCT Filed: Jun. 5, 2020

(86) PCT No.: PCT/DE2020/100475
§ 371 (c)(1),
(2) Date: Dec. 23, 2021

(87) PCT Pub. No.: WO2020/259748
PCT Pub. Date: Dec. 30, 2020

(65) Prior Publication Data
US 2022/0355949 A1    Nov. 10, 2022

(30) Foreign Application Priority Data
Jun. 25, 2019   (DE) ............... 10 2019 117 055.9

(51) Int. Cl.
*B64D 45/00*   (2006.01)
*B64C 1/14*    (2006.01)
(Continued)

(52) U.S. Cl.
CPC ........ *B64D 45/0026* (2019.08); *B64C 1/1469* (2013.01); *E05B 43/00* (2013.01); *E05B 65/0085* (2013.01); *E05B 83/00* (2013.01)

(58) Field of Classification Search
CPC .. E05B 43/00; E05B 43/005; E05B 2043/002; E05B 2043/007; E05B 65/00;
(Continued)

(56) References Cited

U.S. PATENT DOCUMENTS 5,267,368 A  * 12/1993 Saunders ............... B64F 1/305
                                                    135/132
6,719,337 B1 *  4/2004 Ji ......................... E05C 19/022
                                                    292/121
(Continued)

FOREIGN PATENT DOCUMENTS

CN         104507803        4/2015
CN         204956671        1/2016
(Continued)

OTHER PUBLICATIONS

Chinese Search Report issued on Aug. 23, 2022 by the Chinese Patent Office In Chinese Application 2020800441578.
(Continued)

*Primary Examiner* — Nathan Cumar
(74) *Attorney, Agent, or Firm* — Henry M. Feiereisen LLC (57) ABSTRACT

A device for preventing access to an area of an aircraft includes a first vertical frame post designed for attachment to a structure of the aircraft, a second vertical frame post designed for attachment to a structure of the aircraft, a barrier element displaceably connected to the first frame post and including a latching element for detachable connection of the barrier element to the second frame post, and a delay unit including a spring-loaded damping cylinder displaceable into a damping position by a locking movement in opposition to a spring force. The delay unit is designed to release the latching element after a time delay.

16 Claims, 9 Drawing Sheets

(51) Int. Cl.
*E05B 43/00* (2006.01)
*E05B 65/00* (2006.01)
*E05B 83/00* (2014.01)

(58) Field of Classification Search
CPC ...... E05B 65/0085; E05B 83/00; E05B 83/01; B64D 45/00; B64D 45/0015; B64D 45/0018; B64D 45/0021; B64D 45/0026; B64D 45/0028; B64D 45/0029; B64C 1/00; B64C 1/14; B64C 1/1407; B64C 1/1423; B64C 1/143; B64C 1/1438; B64C 1/1461; B64C 1/1469
USPC ......................................................... 292/121
See application file for complete search history.

(56) References Cited

U.S. PATENT DOCUMENTS

| | | | |
|---|---|---|---|
| 8,925,863 B2* | 1/2015 | Pujol | B64D 45/0036 244/118.5 |
| 2003/0136878 A1* | 7/2003 | Watson | B64D 45/0028 244/118.5 |
| 2005/0116098 A1* | 6/2005 | Martens | B64C 1/1469 244/118.5 |
| 2005/0218266 A1* | 10/2005 | Bandy | G07C 9/0069 244/118.5 |
| 2006/0000946 A1* | 1/2006 | Garofani | B64D 11/00 52/64 |

FOREIGN PATENT DOCUMENTS

| | | |
|---|---|---|
| DE | 102014104921 | 10/2015 |
| WO | WO 84/01404 | 4/1984 |
| WO | WO-8401404 A1 * | 4/1984 |
| WO | WO 03/057563 | 7/2003 |

OTHER PUBLICATIONS

Translation of Chinese Search Report issued on Aug. 23, 2022 by the Chinese Patent Office in Chinese Application 2020800441578.
International Search Report issued on Oct. 20, 2020 by the European Patent Office in International Application PCT/DE2020/100475.

* cited by examiner

DEVICE FOR PREVENTING ACCESS TO AN AREA OF AN AIRCRAFT

The invention relates to a device for preventing access to an area of an aircraft according to the features in the preamble of claim 1.

It is inevitable that on long flights crew members have to open the cockpit door, be it to go to the lavatory or to serve the flight crew a meal. Opening the secured cockpit door is a security risk. There are various methods of protecting the cockpit, when the cockpit door has to be opened during a flight. The access area may be observed by the crew members. Other crew members can get in the way. The path may also be blocked with a kitchen cart. As an alternative, additional barriers, so-called secondary barriers, are installed. They can achieve a higher level of security than improvised, not permanently installed barriers, e.g. kitchen carts, or also compared to purely human barriers.

Examples of such secondary barriers are described in US 2006/0000946 A1, US 2003/0136878 A1 and U.S. Pat. No. 8,925,863 B2.

Common to all solutions is the intention to provide the cockpit crew with enough time to close the cockpit door again. The so-called secondary barrier should therefore preferably not be able to be opened quickly, so that there is enough time to close the cockpit door. For example, a 100 kg man should be held up for at least 5 seconds before he reaches the cockpit door.

Such a device for preventing access to an area of an aircraft must meet various requirements: In particular, it should not interfere when the aircraft is on the ground, at the same time it should be safe and easy to retrofit. In addition, it should be lightweight and require as little space as possible when not in use and protrude as little as possible into the walk-through area when it is not needed.

The invention is based on the object to provide a device which is easy to handle and in particular meets the other afore-mentioned requirements.

This object is achieved by a device with the features of claim 1.

The subclaims relate to advantageous refinements of the invention.

The device according to the invention for preventing access to an area of an aircraft includes a first vertical frame post and a second vertical frame post. They are attached to the structure of the aircraft. Furthermore, the device according to the invention includes a barrier element. The barrier element is displaceably connected to the first frame post and is detachably coupled to the second frame post. Provision is made for this purpose for at least one latching element. When the barrier element is detachably connected to the second frame post, access to the area to be protected is already prevented. Spanning the barrier element or closing off the passageway between the frame posts is simple and fast. Conversely, opening should only be possible with a time delay. The invention provides for a delay unit which acts in opposition to an unlocking movement. The delay unit is designed to release the at least one latching element after a time delay. The time delay is dimensioned such that the barrier element cannot be detached from the second frame post prior to elapse of the time delay.

The delay unit includes a spring-loaded damping cylinder. Such a damping cylinder, which can be referred to as a piston-cylinder unit, includes a cylinder filled in particular with hydraulic fluid and having different damping properties in the pulling and pushing directions. The damping cylinder is displaceable to a damping position by a locking movement in opposition to a spring force. The locking movement causes a spring to be biased so as to build up or increase the spring force. The spring force can be a compressive force. The spring force opposes the locking movement. The direction of the spring force is opposite to the direction of the locking movement. A spring element for the spring force, in particular a helical compression spring, can be supported upon an abutment of the barrier element or the damping cylinder. In particular, a piston rod of the damping cylinder is located inside the spring. This saves installation space and guides the spring at the same time.

The delay unit can have a very small overall size and, in particular, be very slim. This has the advantage that virtually no protruding components are required on the second frame post.

When the barrier element can be stowed in addition in such a way that it effectively does not protrude into the walk-through area, the overall device requires in the open position only very little installation space in the aircraft cabin.

In addition, it is possible with the invention to assemble a barrier very quickly. For this purpose, the delay unit acts in particular only in one direction, i.e. in opposite direction to the unlocking movement. In the case of a linear locking movement from top to bottom, the delay unit does not yet act in a time delayed manner. Only when unlocking, i.e. when the latching elements shall be released again, does the delay unit act in opposition to the unlocking movement, in particular for a duration of at least 5 seconds, and optionally also for 30 seconds, 1 minute, or even longer. The delay unit is exchangeable and customizable.

While the prior art suggests to render latching units not easily accessible, e.g. to be placed close to the floor or according to the principle of lever in a box, in another box, another box, etc., in order to delay the opening process in this manner, this task is assumed in the invention by a delay unit, which in a first configuration is integrated in the barrier element. The barrier element is displaceable relative to the second frame post. As a result, a locking movement can be executed with respect to the second frame post via the barrier element in order to detachably connect the barrier element to the second frame post. The second frame post may virtually be designed as a face plate. It serves to receive the at least one latching element that protrudes from the barrier element.

During locking, the delay unit can engage a locking recess on the first frame post. A catch that engages the locking recess can be arranged on the delay unit. The delay unit is moved together with the catch relative to the locking recess. The catch is pushed upwards when the barrier element is lowered by e.g. 30 mm. The piston rod of the damping cylinder is pulled by the catch out of the damping cylinder in opposition to the spring force. A spring element for the spring force, in particular a helical compression spring, can be supported upon an abutment of the barrier element for this purpose.

After the delay unit has been moved into the damping position in opposition to the spring force, the barrier element shall remain in this position before it is released again. It is therefore advantageous, when the barrier element can be locked in the locking position by a locking element that acts between the barrier element and the second frame post. The locking element is in particular linearly displaceable. It is preferably arranged in or on the barrier element and can engage in a locking opening in the second frame post. The locking element can be spring-loaded and displaced into a locking position in opposition to a spring force. For unlocking, a blocking element can release the locking element, which is then pushed back into its open starting position under the impact of the spring force. It is also conceivable that a spring force acts permanently on the locking element to press the locking element into a closed position. In this case, the locking element must be actively withdrawn in opposition to the spring force for unlocking in order to release the barrier element from the second frame post.

In a further advantageous configuration of the invention, the barrier element is a flexible barrier that has a barrier post. The barrier post is the element which should be connected to the second frame post. In particular, the barrier post is rigid while the barrier is flexible. The flexible barrier involves in particular a textile material, in particular a mesh or fabric. This flexible barrier can be rolled up, folded or creased and thus stowed in the tightest of spaces.

The barrier post preferably includes the at least one latching element, e.g. at least a protruding pin with a terminal thickening and the delay unit. The delay unit in the form of a damping cylinder can be arranged in longitudinal direction of the barrier post, as is the spring element for resetting the delay unit. The latching elements on the barrier post do not interfere, when the latter has been stowed in a space-saving manner when not in use. Several latching elements, e.g. 3-5, are arranged distributed over the height of the barrier post.

In order to simplify handling of the device according to the invention, the barrier post can have a laterally protruding mounting in its foot area for effecting a locking movement through foot actuation. The foot actuation allows application of a relatively high force by way of the own body weight. In this way, the spring force which acts in opposition to the locking movement can be overcome very easily and the barrier element can be snapped into place on the second post.

In a further advantageous configuration of the invention, the delay unit is arranged in the second frame post.

In this case, the delay unit can be connected to a closure body which includes an actuating element and is arranged within the second frame post for displacement in longitudinal direction. During locking, the closure body can be moved manually together with the delay unit relative to the second frame post by the actuating element. As a result of a displacement in longitudinal direction, in particular from top to bottom, the piston rod of the damping cylinder is moved in the damping cylinder in opposition to the spring force, which serves to reset the delay force. A spring element for the spring force, in particular a helical compression spring, can be supported on the damping cylinder.

After the delay unit has been moved into the damping position in opposition to the spring force, the closure body should remain in this position before it is released again. It is therefore advantageous when the locking body can be locked in the locking position by a locking element that acts between the locking body and the second frame post. The locking element is in particular linearly displaceable. It is preferably arranged in or on the closure body and can engage a locking opening in the second frame post. The locking element can be spring-loaded and displaced into a locking position in opposition to a spring force. For unlocking, a blocking element can release the locking element, which is then pushed back into its open starting position under the impact of the spring force. It is also conceivable that a spring force acts permanently on the locking element which presses the locking element into a closed position. In this case, the locking element must be actively withdrawn in opposition to the spring force for unlocking in order to release the closure body from the second frame post.

When the delay unit is arranged in the second frame post, the barrier element can also be a flexible barrier which includes a barrier post. The barrier post is the element that should be connected to the closure body in the second frame post. In particular, the barrier post is rigid while the barrier is flexible. The flexible barrier is in particular a textile material, in particular a mesh or fabric. This flexible barrier can be rolled up, folded or creased and thus stowed in the tightest of spaces. The barrier post preferably has the at least one latching element, e.g. at least a protruding pin with a terminal thickening and the delay unit. Before the actual locking movement, the barrier element is pushed into the closure body. The latching elements on the barrier post do not interfere, when the latter has been stowed in a space-saving manner when not in use. Preferably, several latching elements, e.g. 3-5, are arranged distributed over the height of the barrier post.

It is considered particularly advantageous when the direction of the locking movement is parallel to the second frame post. In particular, the locking movement is carried out from top to bottom, in opposition to the gravity. The locking movement takes place over 20 to 50 mm.

It is considered to be particularly advantageous when the at least one latching element engages behind edges of an opening in the closed position according to the principle of a mushroom head lock. The opening is either located on the second frame post or on the closure body. The opening can be an integral component of the frame post or the closure body. A latching element in the form of a pin, with a head thickened in cross-section, can be inserted into the opening, which for this purpose is widened at one end in order to receive the thickened head of the pin. As a result of the locking movement parallel to the second frame post, the thickened head gets behind the edges of the opening, through which only the shaft of the pin reaches. As a result, the barrier element can no longer be displaced in the direction of the first door post. The latching element held in this way is fixed in the closed position by the locking element, which prevents a displacement of the barrier post or the closure body.

In a refinement of the invention, an upper frame part is arranged on the first frame post and can be pivoted upwards in direction of the second frame post. The upper frame part provides guidance of an upper edge of the flexible barrier or guidance of the barrier post from the first frame post to the second frame post. The upper frame part can preferably be coupled to the second frame post. It may involve a form-fitting connection, e.g. by providing the second frame post with a projection which is overlapped by the upper frame part. The reverse configuration is also conceivable.

Pivoting takes place about a horizontal pivot axis so that the upper frame part can be pivoted downwards onto the retracted, flexible barrier when not in use. When not in use, the barrier can be held on the first frame post by the upper frame part which is pivoted downwards.

In a refinement of the invention, a lower frame part is arranged on the first frame post. The lower frame part can also be designated as a threshold. This lower frame part can be pivoted downwards in direction of the second frame post. The lower frame part is provided to protect the floor but can also serve to guide the underside of the barrier post and the flexible barrier. In order for the lower frame part to not represent a trip hazard when not in use, the lower frame part can also be pivoted again in the direction of the second frame post when not in use. Just like the upper frame part, the lower frame part can hold the flexible barrier upon the first frame post when not in use.

The lower frame part can in particular be coupled to the second frame post. Coupling may be realized through mutual form-fitting engagement. For this purpose, either a projection is arranged on the lower frame part to engage a recess on the frame post, or the frame post has a projection which engages an aperture on the lower frame part.

After opening the device, i.e. when the flexible barrier is withdrawn, the lower frame part can be elevated again. For this purpose, a band or a belt can be arranged on the lower frame part, so that an operator does not have to bend down towards the lower frame part. In the same way, the upper frame part may also be provided with a band or a belt in order to grab the upper frame part and pull it down.

The lower frame part and the upper frame part significantly increase the security function of the device according to the invention, since reaching over or under the barrier is prevented by the guides on the upper and lower frame parts.

In a refinement of the invention, provision is made for connecting the upper frame part to a lifting cylinder which exerts a force on the upper frame part to maintain it in an open position. The lifting cylinder is in particular connected to the first frame post. When the upper frame part is released from the position in which it has been pivoted downwards, the lifting cylinder, in particular a gas pressure cylinder, can push the upper frame part upwards and lock it with the opposite frame post. The barrier element cannot be moved beforehand. After opening the device according to the invention, the upper frame part cannot drop, because the lifting cylinder holds it atop. The lifting cylinder is retracted, when the upper frame part is manually pivoted back downwards again. The force required for this can be applied using a handle, for example using a band or belt, which is attached to the upper frame part.

The first frame post is preferably provided with a container in which the flexible barrier is arranged when not in use. The barrier can in particular be rolled up or folded and accommodated in a tall and slim container in a very space-saving manner. The container also holds the frame post at the same time. It can have a lid or a closing element that prevents the barrier from spontaneously being released from the container. At the same time, the container can be closed by the upper frame part or lower frame part. It is also conceivable that the upper frame part and the lower frame part form at least one wall of the container.

Depending on local conditions, the container can be mounted on the frame post so as to be pivotable about a vertical axis. The locations in an aircraft may potentially not allow a frame post with a container to be placed in a passageway. However, it is conceivable to arrange such a frame post in a corner area outside the passageway. However, it is then not directly opposite the second frame post. By mounting a container on the frame post for pivoting about a vertical axis, the container can be positioned outside the passageway in a space-saving manner when not in use and is only pivoted into the passageway when the barrier is to be erected.

Exemplary embodiments of the invention are explained hereinafter with reference to purely schematic drawings. It is shown in.

Figure 1:
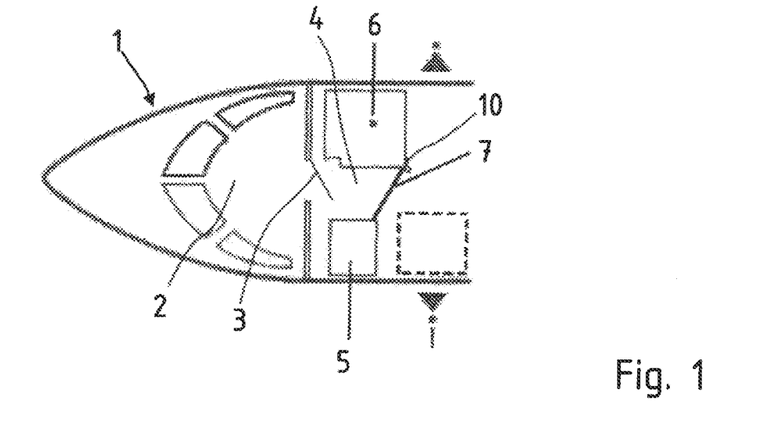
FIG. 1 a cross section through the front area of an aircraft with the device according to the invention.
Figure 2:
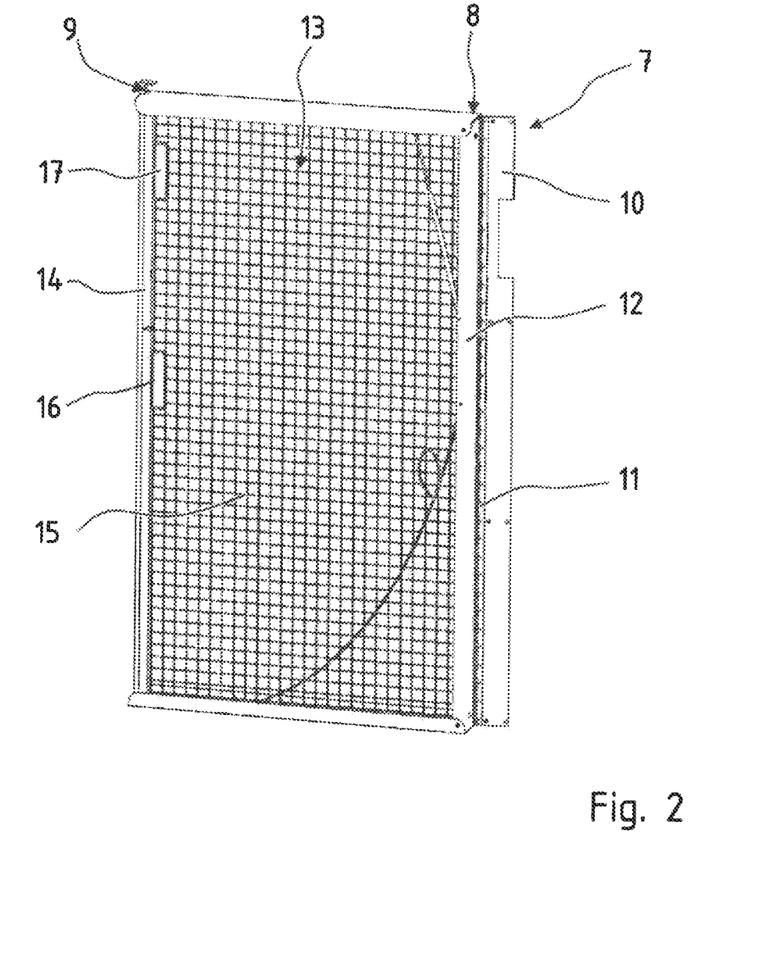
FIG. 2 a first view of the device according to the invention in closed position.

FIG. 1 shows a portion of an aircraft 1 with a cockpit 2 and with a cockpit door 3 which separates a passageway 4 between a lavatory 5 and a galley 6. The device 7 according to the invention is arranged diagonally between the corner areas of the lavatory 5 and the galley 6. The illustration in FIG. 2 shows the device 7 according to the invention. It blocks access to the passageway 4 or to the cockpit 2 while the cockpit door 3 is open. The device according to the invention includes a first vertical frame post 8 and a second vertical frame post 9 at a distance from the first frame post 8. The two frame posts 8, 9 are connected to the structure of the aircraft, i.e. in the exemplary embodiment in FIG. 1, on the one hand, with the lavatory 5, on the other hand, with a wall of the galley 6. The first vertical frame post 8 is constructed in two parts. It has a fastening section 10. This fastening section 10 is to be connected to the wall of the galley 6. The second part of the frame post is connected to the fastening section 10 via a joint 11 in the form of a strap hinge. The second part of the frame post 8 is a container 12 in which a barrier element 13 can be accommodated. The barrier element 13 in FIG. 2 is spanned between the first frame post 8 and the second frame post 9. The barrier element 13 is displaceably connected with the first frame post 8. It is attached to the first frame post 8. To close the passageway 4, it can be detachably connected to the second frame post 9.

For this purpose, the barrier element 13 has a barrier post 14. The barrier post 14 is made in particular of a light but strong material, for example aluminum. The barrier 15 arranged between the barrier post 14 and the container 12 of the first frame post 8 is made in this case of a resistant mesh. A handle 16 is arranged in the barrier 15 in order to grab the barrier post 14 and to attach the barrier element 13 in the second frame post 9. Located in the upper region of the barrier 15 is a through opening 17 in order to be able to actuate an operating element on the opposite side of the barrier element 13.

Figure 3:
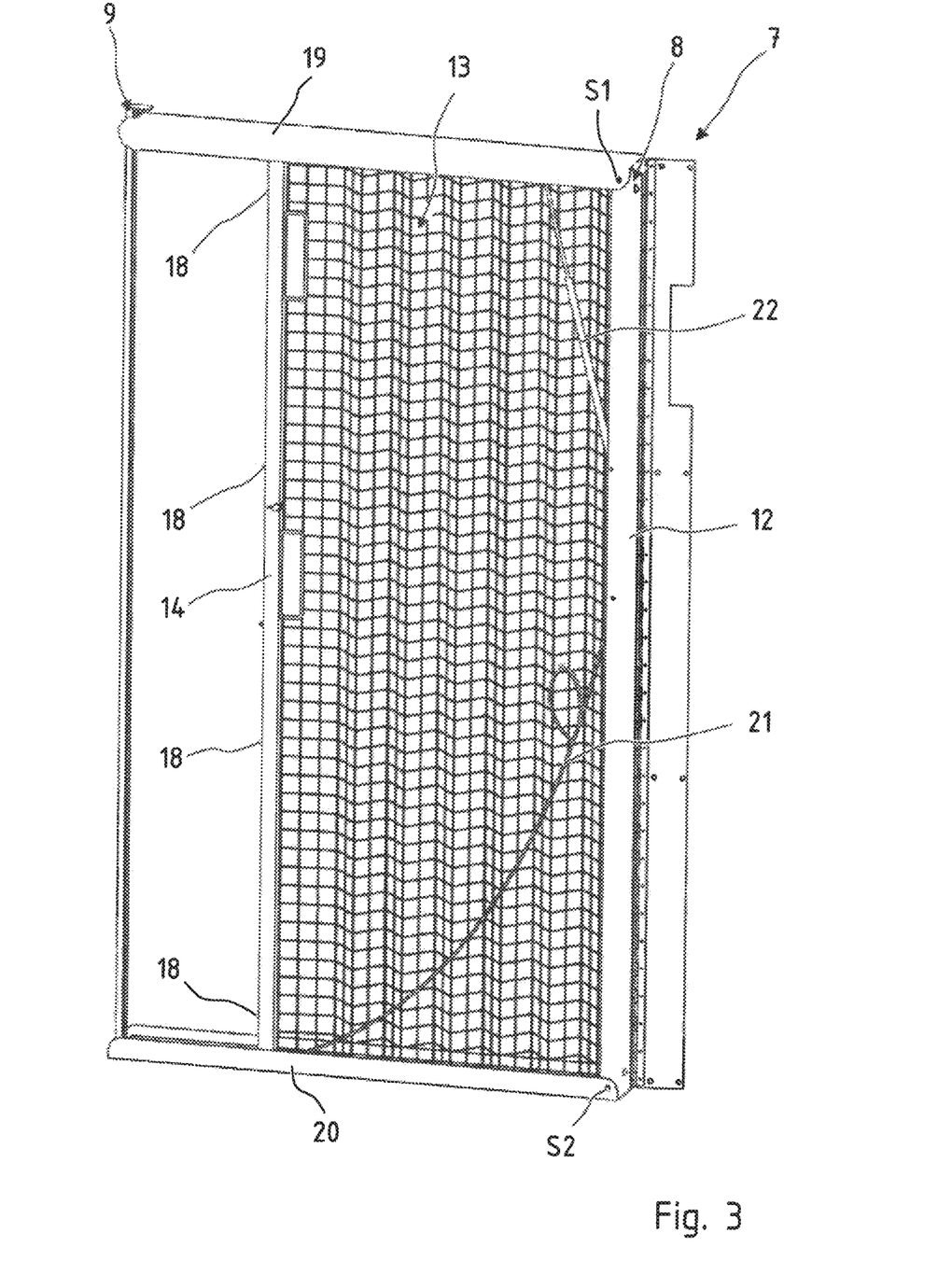
FIG. 3 the device according to the invention in a half-open position.

FIG. 3 shows the barrier element 13 in an intermediate position. The device 7 according to the invention has just been opened by detaching the barrier post 14 from the second frame post 9. As can be seen, latching elements 18 are arranged in four different height levels on the barrier posts 14. In the closed position, they can be brought into formfitting engagement with the second frame post 9.

The barrier element 13 is guided on top and bottom in an upper frame part 19 or frame part 20 arranged in the region of the threshold. The further frame parts 19, 20 are pivotably connected to the first frame post 8 via two pivot axes S1, S2, which point in the horizontal direction.

Figure 4:
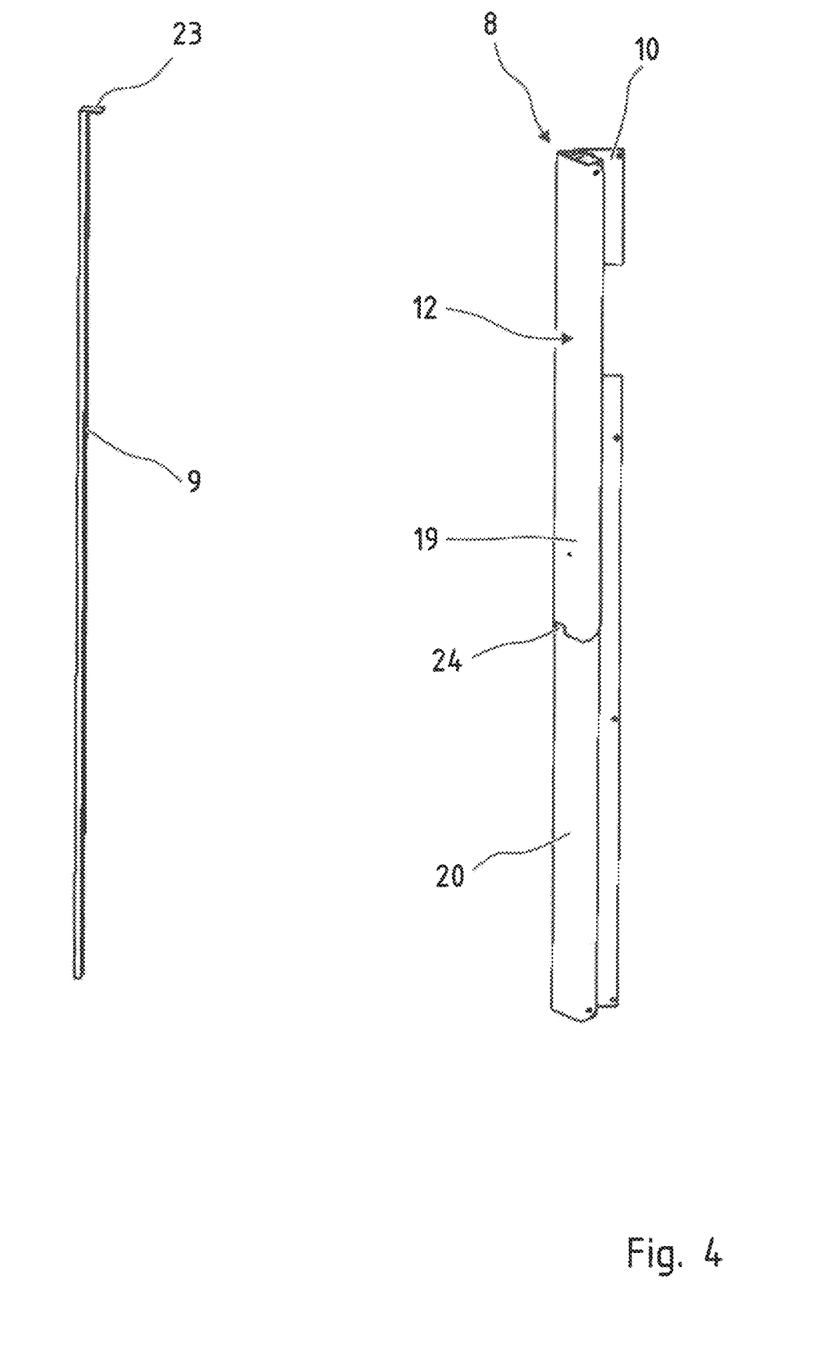
FIG. 4 the device according to the invention of FIGS. 2 and 3 in an open position.

When the barrier element 13 has been pushed into the container 12, the container 12 is closed. For this purpose, the lower frame part 20 is pivoted upwards by means of a rope-shaped handle 21, which is fastened to the lower frame part 20 approximately in midsection. The upper frame part 19 is held in the extended position by a lifting cylinder 22, even when the barrier element 13 is retracted. The upper frame part 19 is then also folded down. This arrangement is shown in FIG. 4. The lower frame part 20 and the upper frame part 19 assume hereby a dual function. On the one hand, they are configured as a guide and accommodate the barrier post 14 with its ends and also the ends of the barrier 15. At the same time, the guide in the closed position shown in FIG. 4 provides a container in which the barrier element 13 is completely stowed. The thus-formed pivotable container 12 is pivoted in the direction of the fastening section 10 of the frame post 8. This completely clears the passageway. As a result of accommodating the barrier element 13, the container 12 of the frame post 8 has a larger structural volume than the opposite frame post 9, which effectively is functionally a face plate for the connection with the barrier element 13.

A projection 23 is arranged at the upper end of the second frame post 9 and is provided for engagement in a recess 24 at the free end of the upper frame part 19, as shown in FIG. 2. The lower frame part 20 also has such a recess, which, however, is concealed in the perspective illustration. In the same way, the lower frame part 20 is aligned in relation to the second frame post 9 in the open position.

Figure 5:
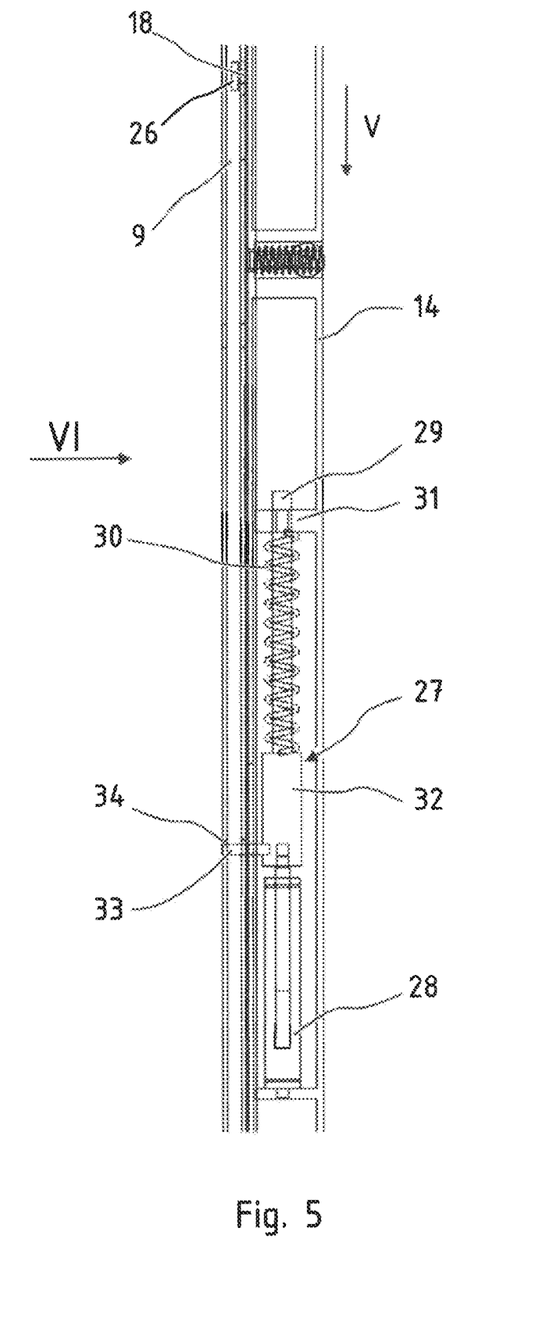
FIG. 5 a side view of a portion of the second frame post and the barrier post by way of a longitudinal section.
Figure 6:
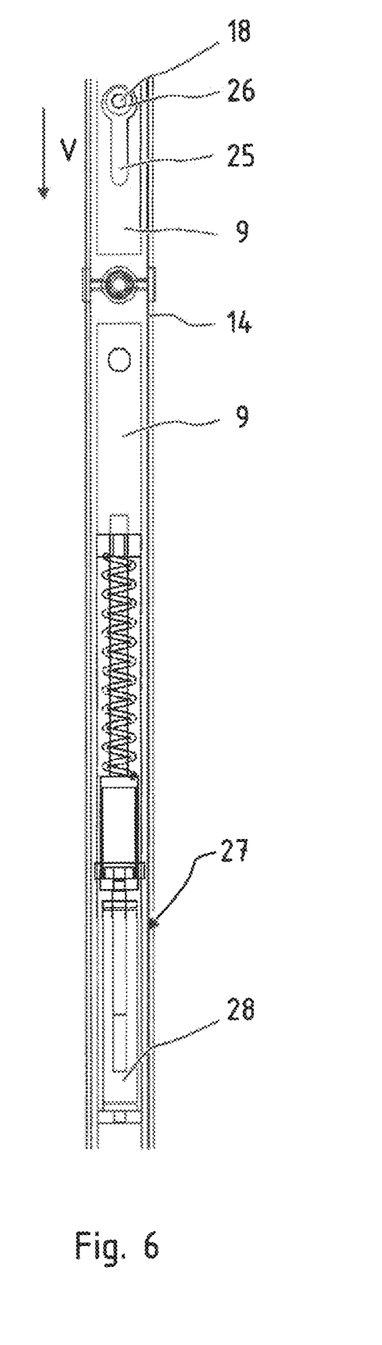
FIG. 6 a view of the arrangement of FIG. 5 in direction of the arrow VI.

FIGS. 5 and 6 are to be considered together. FIG. 5 shows a sectional illustration through a central region of the frame post 9 and the barrier post 14 lying parallel to and against the frame post 9. FIG. 5 shows the situation before locking the two posts. The barrier post 14 is moved to the frame post 9 far enough for the latching unit 18 to engage in an associated aperture 25 on the second frame post 9. The latching element 18 is designed as a pin with a head 26 thickened in diameter. It involves a connection of the type of a mushroom head lock. The plurality of latching elements 18 are all simultaneously initially brought loosely into engagement with the second frame post and then moved downward by a movement in locking direction V.

The locking direction V runs parallel to the frame post 9 and to the barrier post 14. As a result, the head 26 engages behind the narrower, slot-shaped region of the aperture 25. This is shown in FIGS. 7 and 8 or 9 and 10 by way of two different views, respectively. The end position is reached in FIGS. 9 and 10. This is the locking position.

Figure 9:
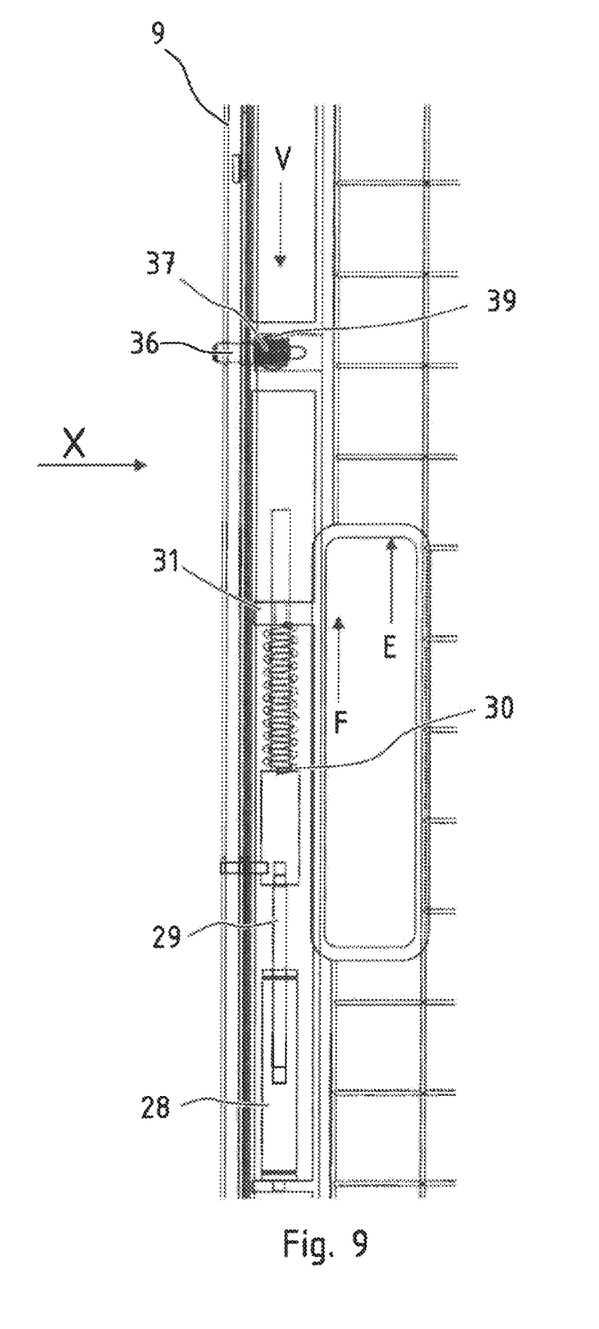
FIG. 9 a longitudinal section of a portion of the second frame post in the locking position.
Figure 10:
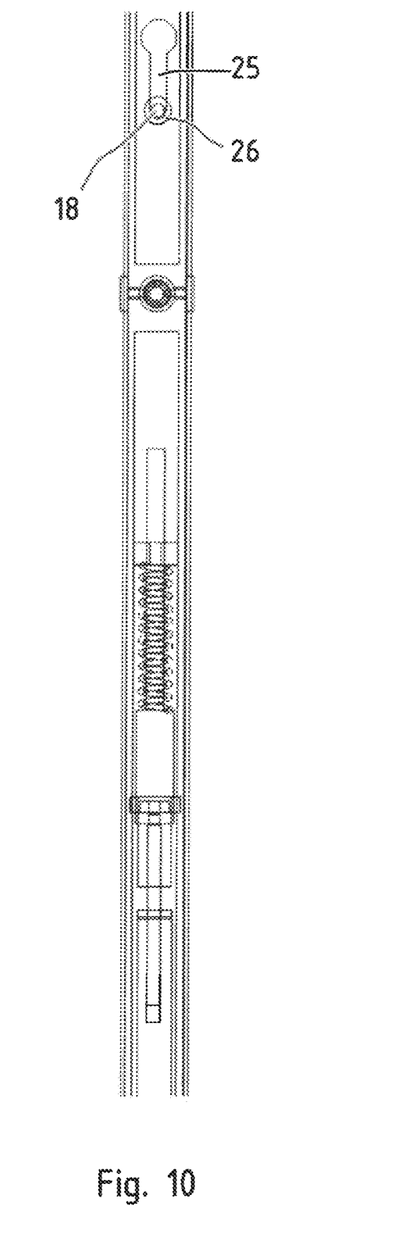
FIG. 10 a view of the arrangement of FIG. 9 in the direction of the arrow X by way of a longitudinal section.

On the way from the starting position according to FIGS. 5 and 6 into the locking position according to FIGS. 9 and 10, a delay unit 27 is maintained under tension. In this exemplary embodiment, the delay unit 27 includes a spring-loaded damping cylinder 28 which extends in longitudinal direction of the barrier post 14. The damping cylinder 28 has a piston rod 29 which is linearly guided within the barrier post 14. A spring element 30 is designed to exert a spring force F on an abutment 31 of the barrier post 14. The direction of the spring force F points in opposition to the locking direction or locking force. Although the spring element 30 is also supported at the same time on a support body 32 which is connected to the piston rod 29, the spring element 30 is biased by the downward movement of the barrier post 14. The spring element 30 is a compression spring. This biasing force is a result of the movement in the locking direction V downwards. The spring element 30 is compressed. Compression is realized by pulling the support body 32, which is fastened to the piston rod 29, out of the damping cylinder 28 together with the piston rod 29. For this purpose, a catch 33 is provided on the support body 32. The catch 33 projects transversely from the support body 32 and engages a locking recess 34 on the second frame post 9. The catch 33 is always in the correct position when the two posts are to be connected to one another, since the spring element 30 applies a certain biasing force and pushes the piston rod 29 repeatedly into the starting position, as shown in FIGS. 5 and 6. It can be seen that the head 26 engages behind the narrower region of the aperture 25. In this position, the barrier element 13 can no longer be withdrawn in the direction of the first frame post 8. It would again have to be shifted upwards in the direction of the widened area of the keyhole-shaped aperture 25. The piston rod 29 has been pulled out of the damping cylinder 28 over a first portion. The spring element 30 in the form of the compression spring has been partially maintained under tension.

Figure 7:
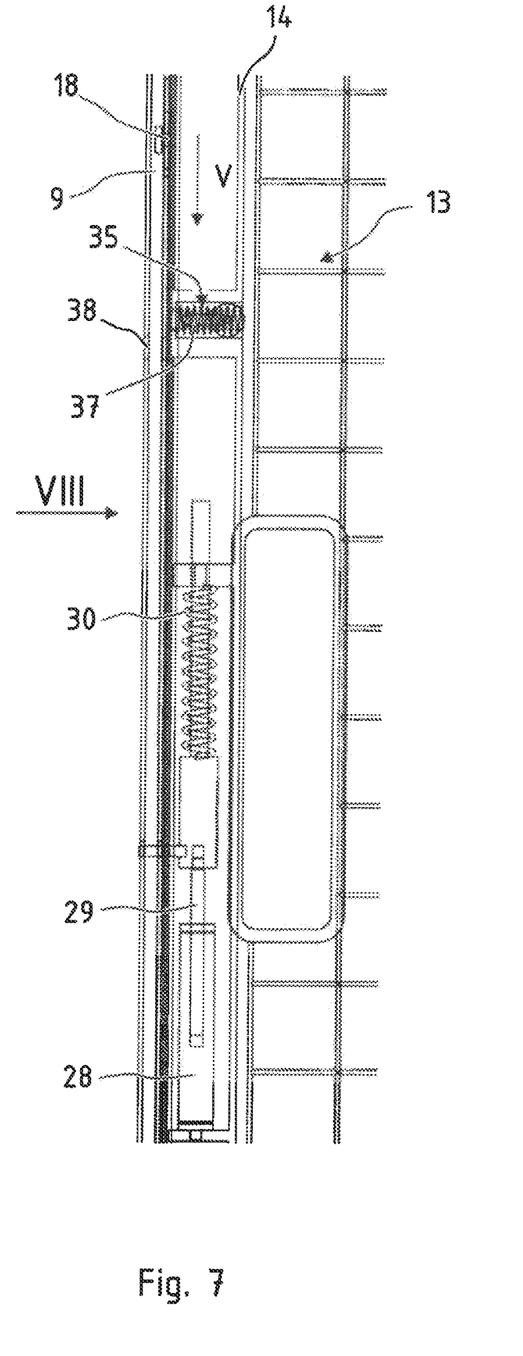
FIG. 7 a longitudinal section of a portion of the second frame post and the barrier element during the locking phase in an intermediate position.
Figure 8:
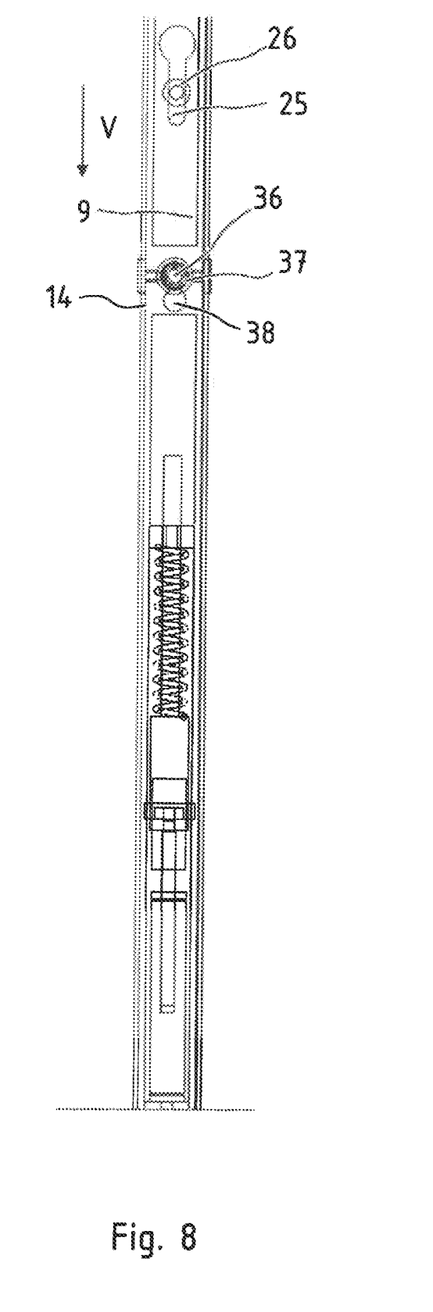
FIG. 8 a longitudinal section of the arrangement of FIG. 7 in the direction of arrow VIII.

It is further apparent from the illustration in FIGS. 8 and 7 that simultaneously with the downward displacement of the barrier post 14 in the direction of the locking direction V, a locking element 35 arranged in the barrier post 14 is also displaced downward at the same time. The locking element 35 includes a locking bar 36 (FIG. 9), which is surrounded by a compression spring 37 and initially held in a retracted position, i.e. it does not protrude beyond the longitudinal side of the frame post 14. When the end position is reached, as shown in FIGS. 9 and 10, it is provided to engage in a snap-in opening 38 which is arranged in the second frame post 9. The second frame post 9 is double-walled as a consequence of the necessary undercut for the head 26 of the latching element 18, or it has a cavity. The snap-in opening 38 extends through the cavity and across both walls of the second frame post 9 that run parallel to one another.

When the snap-in position has been reached, the locking bar 36 is manually moved into the snap-in position by means of an actuating element 39, as shown in FIGS. 9 and 10. The operator can now let go of the barrier element 13 because it remains in the locked position. It cannot be shifted upwards in the direction opposite to the locking direction V, i.e. in unlocking direction E. It can also not be detached from the second frame post 9, because the barrier element 13 is held by the heads 26 of the latching elements 18 in the slot-shaped regions of the apertures 25. The spring element 30 is now maintained under maximum tension.

To release the barrier element 13, the actuating element 39 must be actuated so that the spring 37 pulls the locking bar 36 back into the starting position. The spring force F now acts on the abutment 31 in such a way that the barrier element 13 is displaced upward in the image plane in opposition to the locking direction V. The arrow E designates the unlocking direction E. The spring force F and the unlocking direction E have the same effective direction.

However, the damping cylinder 28 acts in opposition to the insertion movement of the piston rod 29. The piston in the damping cylinder 28 is configured in such a way that even though the piston rod 29 can be easily pulled out so as to be able to quickly close the barrier element 13; However damping is realized by a hydraulic fluid when the piston rod 29 is to be pushed back into the damping cylinder 28. This leads to a time delay of the movement in unlocking direction E. The time delay can be controlled via the viscosity and the design of the piston within the damping cylinder 28. The delay time amounts to at least 5 seconds. When the piston rod 29 has completely moved in again, as shown in FIGS. 5 and 6, the latching elements 18 with their thickened head 26 are again located in the widened region of the apertures 25. The barrier element 13 can now be withdrawn again and the entire device can be opened and stowed away.

A further embodiment is shown in FIGS. 11 to 16. It will be explained hereinafter. This second embodiment is largely based on the first embodiment as shown in FIGS. 1 to 4. The main difference is the different arrangement of the delay unit 27. The reference numerals mentioned in the first exemplary embodiment according to FIGS. 1 to 10 are again used for essentially identical components.

Figure 11:
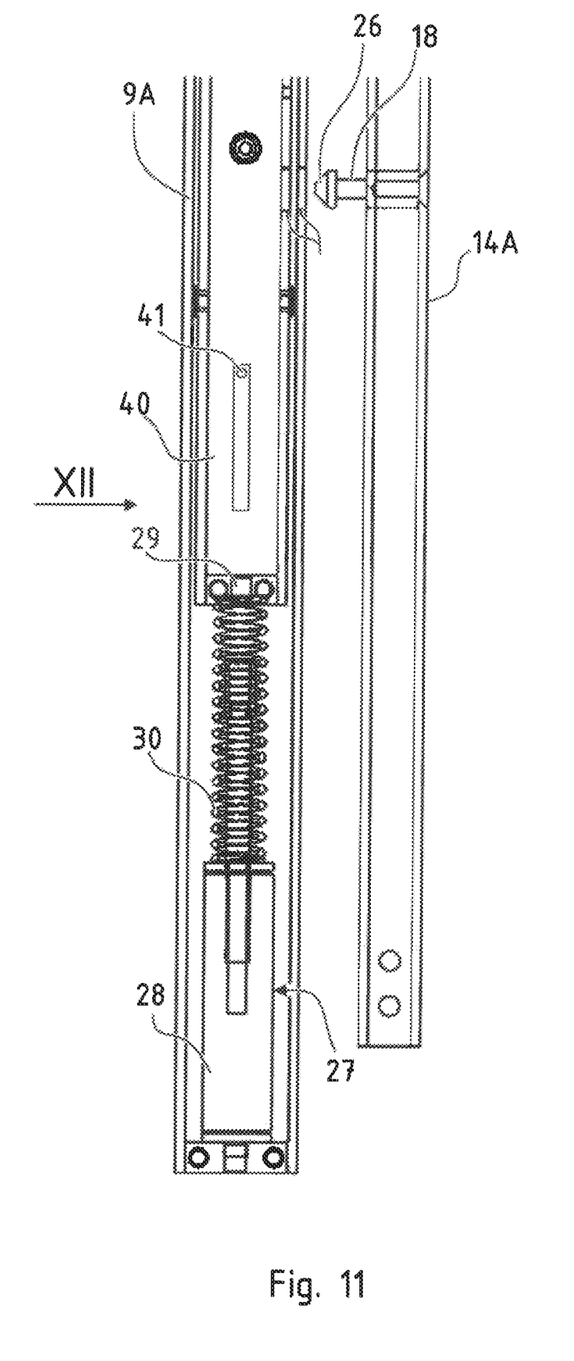
FIG. 11 a side view of a portion of the second frame post and the barrier post by way of a longitudinal section in accordance with a second embodiment.
Figure 12:
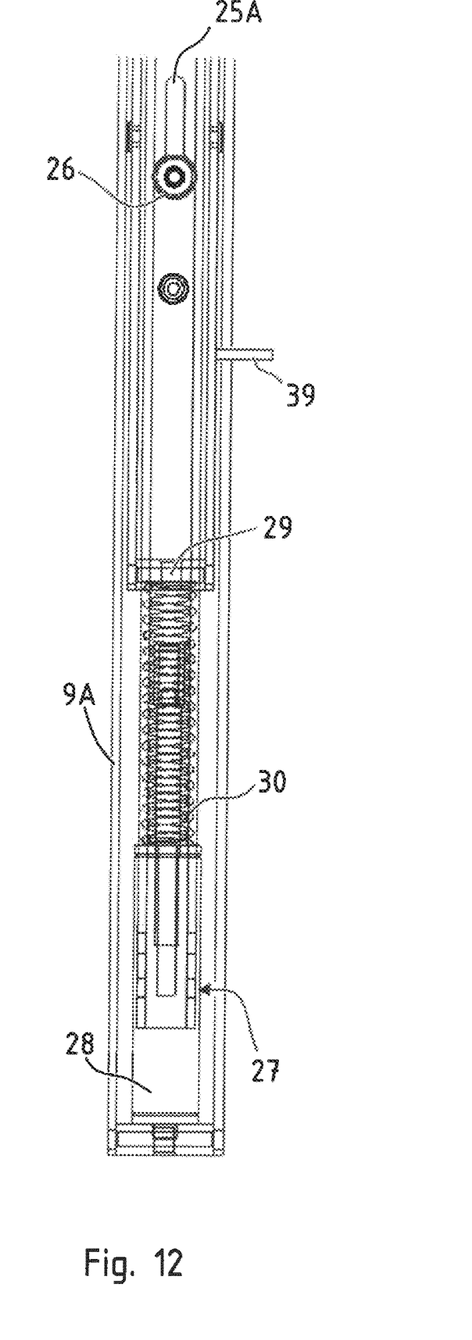
FIG. 12 a view of the arrangement of FIG. 11 in the direction of the arrow XII.
Figure 13:
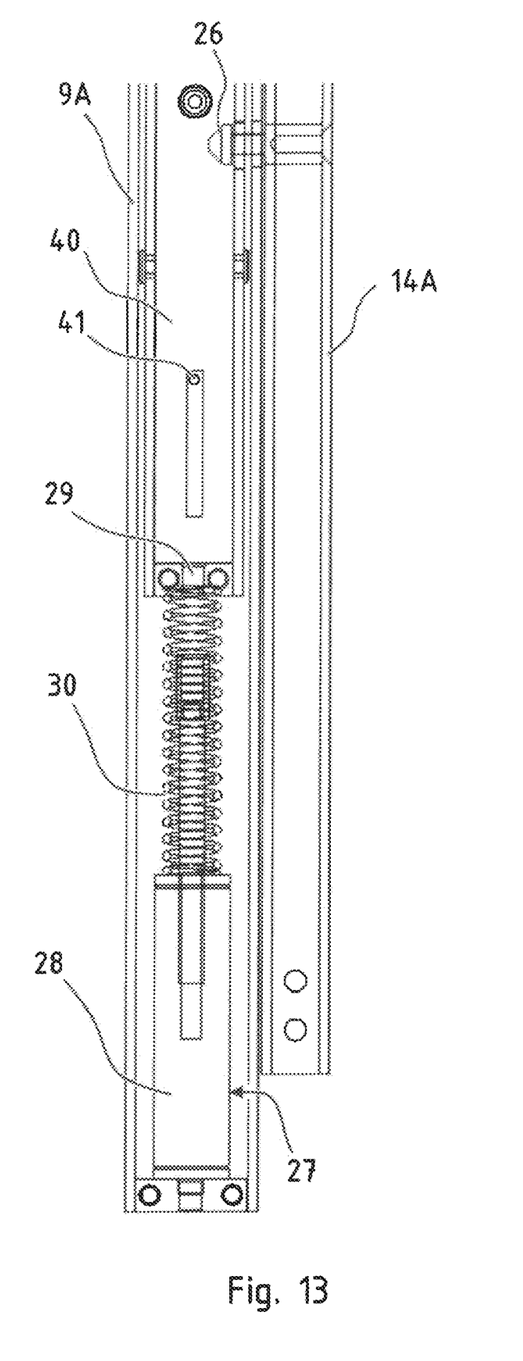
FIG. 13 a longitudinal section of a portion of the second frame post and the barrier post in accordance with the second embodiment during the locking phase in an intermediate position.

FIGS. 11 and 12 are to be considered together. In accordance with the second embodiment, FIG. 11 shows a sectional illustration through a central region of a second frame post 9A and of the barrier post 14A which is parallel and opposite to the second frame post 9A. FIG. 13 shows the situation before locking the two mentioned posts. In the second embodiment, a closure body 40 is arranged inside the hollow second frame post 9A in longitudinal direction. The closure body is connected to a piston rod 29 of the delay unit 27 and has an actuating element 41. With the aid of this actuating element 41, the closure body can be displaced parallel to the longitudinal direction of the second frame post 9A. For locking, the barrier post 14A is moved toward the second frame post 9A far enough for the latching unit 18 to engage in an associated aperture 25 on the second frame post 9A and an associated aperture 25A in the closure body 40. The locking direction V runs parallel to the frame post 9A and to the barrier post 14A. The latching element 18 is designed as a pin with a head 26 thickened in diameter. A connection of the type of a mushroom head lock is involved. The latching element 18 initially loosely engages the closure body 40. The latching element 18 is then positioned behind the slot-shaped region of the aperture 25A by a movement of the closure body 40 in the locking direction V, which is carried out with the aid of the actuating element 41 on the closure body 40. As a result, the head 26 engages behind the narrower, slot-shaped region of the aperture 25A. This is shown in FIG. 14, in which the locking position is reached.

Figure 14:
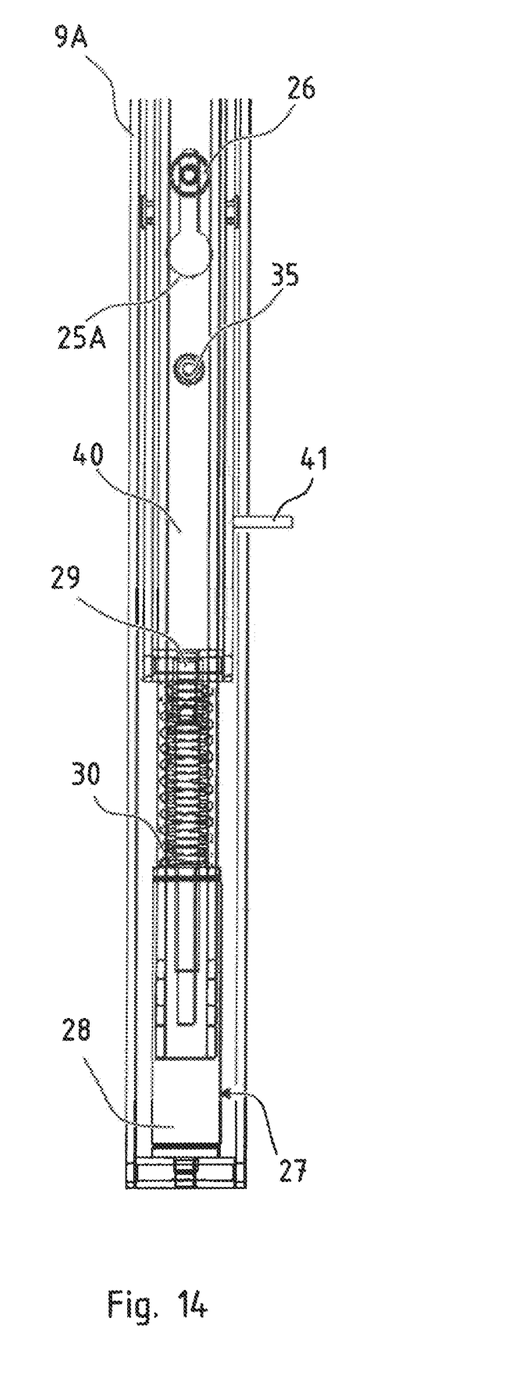
FIG. 14 a longitudinal section of a portion of the second frame post and the barrier post in accordance with the second embodiment in the locking position.

On the way from the starting position according to FIG. 13 into the locking position according to FIG. 14, a delay unit 27 is maintained under tension. In this exemplary embodiment, the delay unit 27 includes a spring-loaded damping cylinder 28 which extends in longitudinal direction of the second frame post 9A. The damping cylinder 28 has the piston rod 29 which moves in longitudinal direction inside the second frame post 9A. A spring element 30 is designed to develop a spring force F upon the closure body 40 within the second frame post 9A. The direction of the spring force F points in opposition to the locking direction or locking force. Although the spring element 30 is also supported at the same time by the pressure cylinder 28, which is connected to the piston rod 29, the spring element 30 is biased by the downward movement of the closure body 40. The spring element 30 is a compression spring. This biasing force is a result of the movement in the locking direction V downwards. The spring element 30 is compressed. Compression is realized by guiding the closure body 40, which is connected to the piston rod 29, downwards, so that the piston rod is guided into the damping cylinder. It can be seen that the head 26 of the latching element 18 engages in this position behind the narrower area of the aperture 25. The barrier element 13 can thus no longer be withdrawn in the direction of the first frame post 8. The piston rod 29 has been guided in the damping cylinder 28. The spring element 30 in the form of the compression spring is maintained under tension (FIG. 14). The closure body 40 would have to be displaced upwards in order to open, so that the widened part of the aperture 25A is again at the level of the head 26.

Figure 15:
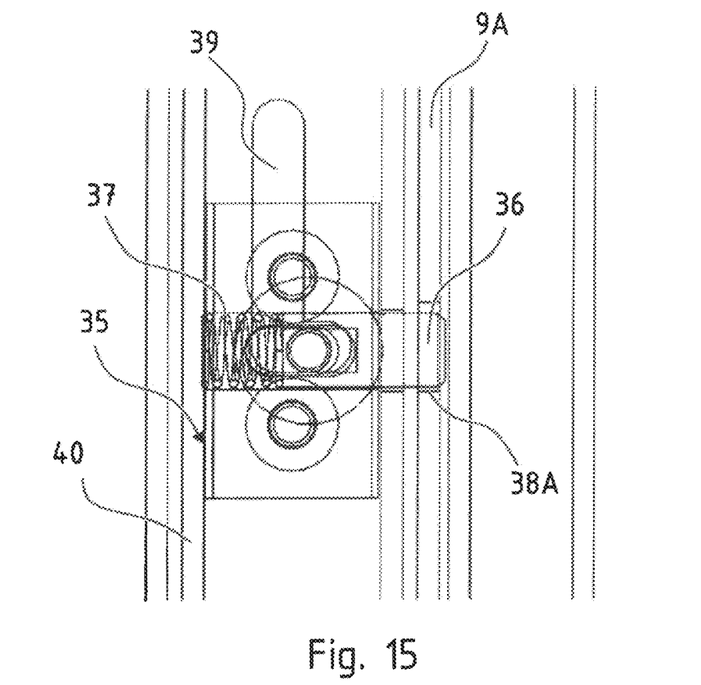
FIG. 15 a view in longitudinal section of a locking element in a locked position.
Figure 16:
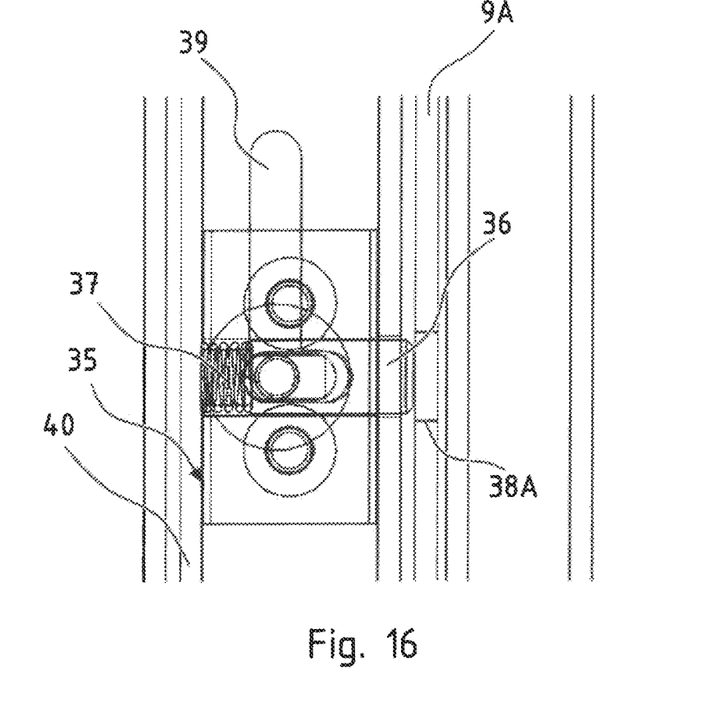
FIG. 16 a view in longitudinal section of the locking element in the open position.

Simultaneously with the downward displacement of the closure body in direction of the locking direction V, a locking element 35 arranged in the closure body 40 is also displaced downwards. The locking element 35 includes a locking bar 36 which is surrounded by a compression spring 37 (FIGS. 15, 16). Initially, the locking bar 36 is held in a retracted position through contact with the inner wall of the hollow frame post 9A, i.e., it does not protrude beyond the longitudinal side of the closure body 40. The compression spring is maintained under tension in this position. The locking bar 36 is provided to engage in a snap-in opening 38 which is arranged in the wall of the second frame post 9A, when reaching the end position, as shown in FIGS. 14 and 15. When the locking bar 36 is engaged, the operator can release the actuating element 41 on the closure body 40 because the latter remains in the locked position. It cannot be displaced upwards in the direction opposite to the locking direction V, i.e. in the unlocking direction E. The barrier element 13 may also not be detached in this position from the second frame post 9A, because the barrier element 13 is held in the slot-shaped regions of the apertures 25 by the heads 26 of the latching elements 18. The spring element 30 is now maintained under maximum tension.

To release the barrier element 13, the actuating element 39 must be actuated so that the spring 37 pulls the locking bar 36 back into the starting position (FIG. 16). The spring force F now acts on the closure body 40 in such a way that it is displaced upward in the image plane in opposition to the locking direction V. The arrow E designates the unlocking direction E. The spring force F and the unlocking direction E have the same effective direction.

However, the damping cylinder 28 acts in opposition to the pull-out movement of the piston rod 29. The piston in the damping cylinder 28 is configured in such a way that the piston rod 29 can be pushed in slightly so that the barrier element 13 can be closed quickly; However damping is effected by a hydraulic fluid when the piston rod 29 is to be pulled out of the damping cylinder 28 again. This leads to a time delay of the movement in the unlocking direction E. The time delay can be controlled via the viscosity and the design of the piston within the damping cylinder 28. The delay time amounts to at least 5 seconds. When the piston rod 29 assumes again the unlocking position, as shown in FIG. 13, the latching elements 18 with their thickened heads 26 are located again in the widened regions of the apertures 25A. The barrier element 13 can now be withdrawn again and the entire device can be opened and stowed away.

REFERENCE SIGNS

1—aircraft
2—cockpit

3—cockpit door
4—passageway
5—lavatory
6—galley
7—device to prevent entry
8—first frame post
9—second frame post
9A—second frame post
10—fastening section of 8
11—joint of 8
12—container on 8
13—barrier element
14—barrier post
14A—barrier post
15—barrier
16—handle
17—through opening
18—latching element
19—upper frame part
20—lower frame part
21—handle on 20
22—lifting cylinder on 19
23—projection
24—recess
25—aperture in 9
25A—aperture in 40
26—head of 18
27—delay unit
28—damping cylinder
29—piston rod of 28
30—spring element
31—abutment on 14
32—support body on 29
33—catch
34—locking recess
35—locking element
36—locking bars of 35
37—spring of 35
38—snap-in opening for 36 in 9
38A—snap-in opening for 36 in 14A
39—actuating element
40—closure body
41—actuating element on 40
E—unlocking direction
F—spring force
S1—pivot axis
S2—pivot axis
V—locking direction

The invention claimed is:

1. A device for preventing access to an area of an aircraft, said device comprising:
   a first vertical frame post designed for attachment to a structure of the aircraft;
   a second vertical frame post designed for attachment to a structure of the aircraft;
   a barrier element displaceably connected to the first frame post and including a latching element for detachable connection of the barrier element to the second frame post;
   a delay unit arranged in the second frame post and including a spring-loaded damping cylinder displaceable into a damping position by a locking movement in opposition to a spring force, said delay unit designed to release the latching element after a time delay;
   a closure body arranged for displacement in the second frame post in a longitudinal direction of the second frame post and Including an actuating element to move the closure body manually, said delay unit being connected to the closure body; and
   a locking element acting between the closure body and the second frame post and designed to lock the closure body in a locking position.

2. The device of claim 1, wherein the delay unit is designed to engage a locking recess on the second frame post during locking.

3. The device of claim 1, further comprising a locking element acting between the barrier element and the second frame post for locking the barrier element in a locking position.

4. The device of claim 1, wherein the barrier element includes a flexible barrier and a rigid barrier post which is designed to accommodate the delay unit, said latching element being arranged on the rigid barrier post.

5. The device of claim 1, wherein the barrier post includes in a foot area thereof a protruding mounting designed to execute the locking movement through foot actuation.

6. The device of claim 1, wherein the barrier element includes a flexible barrier and a rigid barrier post, said latching element being arranged on the rigid barrier post.

7. The device of claim 1, wherein the locking movement is parallel to the second frame post'.

8. The device of claim 1, wherein the latching element is hooked into a closing opening in a closed position according to the principle of a mushroom head lock.

9. The device of claim 1, further comprising an upper frame part arranged on the first frame post includes and mounted for pivoting upwards in a direction of the second frame post.

10. The device of claim 1, further comprising a lower frame part arranged on the first frame post and mounted for pivoting downwards in a direction of the second frame post.

11. The device of claim 1, further comprising a lifting cylinder connected to he upper frame part for exerting a force on the upper frame part in order to hold the upper frame part in an open position.

12. The device of claim 1, wherein the first frame post includes a container, said barrier element including a flexible barrier which is arranged in the container when not in use.

13. The device of claim 9, wherein the upper frame part is designed for coupling to the second frame post.

14. The device of claim 9, further comprising a lower frame part arranged on the first frame post and mounted for pivoting upwards in a direction of the second frame post, said barrier element including a flexible barrier which is guided in the lower frame part and/or in the upper frame part.

15. The device of claim 10, wherein the lower frame part is designed for coupling to the second frame post.

16. The device of claim 11, wherein the container is mounted on the first frame post for pivoting about a vertical axis.

* * * * *